Figure 4:
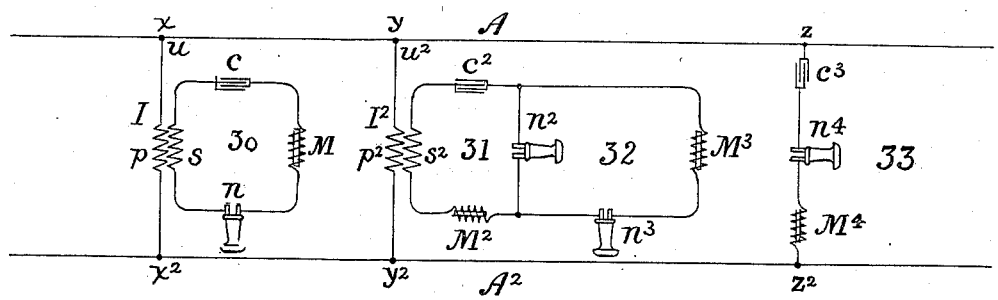

No. 726,476. PATENTED APR. 28, 1903.
J. S. STONE.
ELECTRICAL DISTRIBUTION AND SELECTIVE DISTRIBUTION.
APPLICATION FILED MAR. 12, 1903.
NO MODEL. 2 SHEETS—SHEET 1.
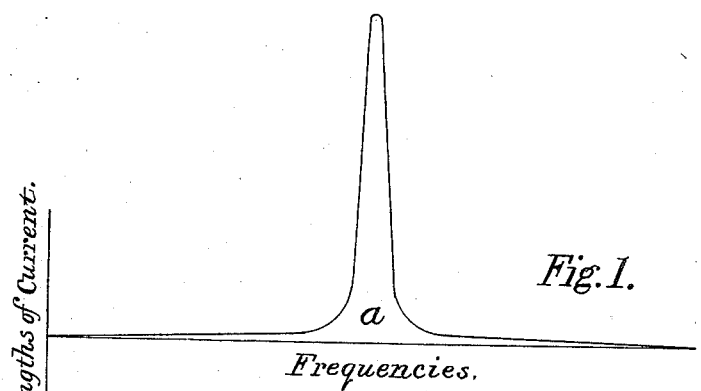
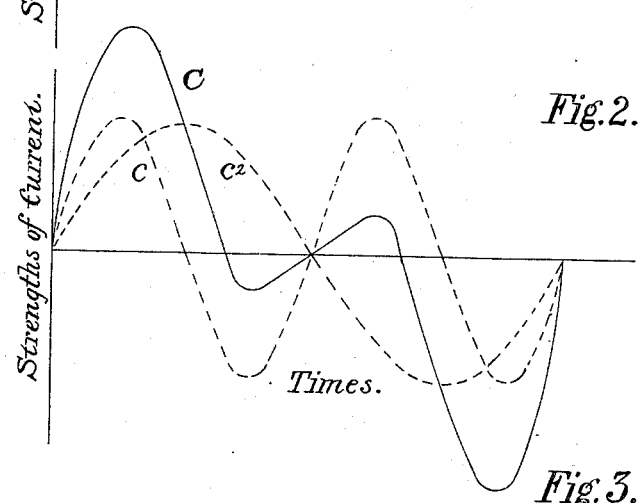
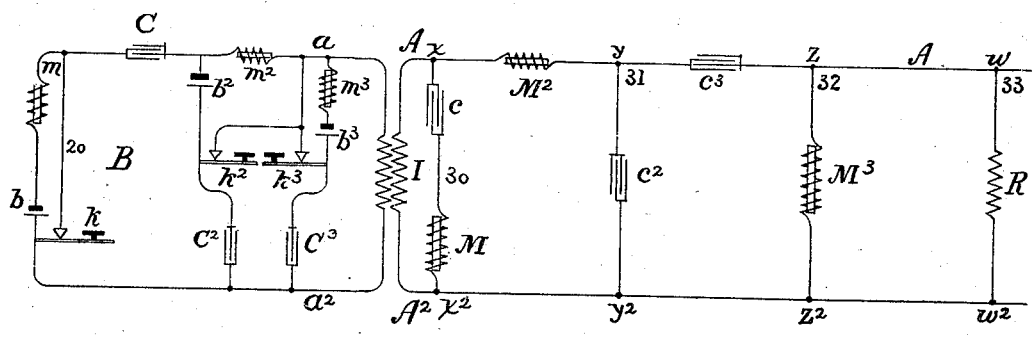
WITNESSES: INVENTOR.

No. 726,476.  
PATENTED APR. 28, 1903.  
J. S. STONE.  
ELECTRICAL DISTRIBUTION AND SELECTIVE DISTRIBUTION.  
APPLICATION FILED MAR. 12, 1903.  
NO MODEL.  
2 SHEETS—SHEET 2.

WITNESSES:  
Joseph A. Gately  
Frank C. Lockwood.

INVENTOR.  
John Stone Stone.  
BY  
Mauro Cameron Lewis  
ATTORNEYS.

UNITED STATES PATENT OFFICE.

JOHN STONE STONE, OF CAMBRIDGE, MASSACHUSETTS, ASSIGNOR TO THE AMERICAN BELL TELEPHONE COMPANY, A CORPORATION OF MASSACHUSETTS.

ELECTRICAL DISTRIBUTION AND SELECTIVE DISTRIBUTION.

SPECIFICATION forming part of Letters Patent No. 726,476, dated April 28, 1903.

Original application filed April 4, 1894, Serial No. 506,316. Divided and this application filed March 12, 1903. Serial No. 147,535. (No model.)

*To all whom it may concern:*

Be it known that I, JOHN STONE STONE, residing at Cambridge, in the county of Middlesex and State of Massachusetts, have invented certain Improvements in Electrical Distribution and Selective Distribution, of which the following is a specification.

This invention comprises improvements in electrical apparatus and circuits whereby new and improved methods of electrical selection, analysis, and distribution may be put into effect. By means of these methods and appliances vibratory electromotive forces or electric currents of different frequencies or rates of vibration simultaneously impressed upon an electric circuit may be individualized and selectively utilized, regulated, absorbed, or distributed.

The invention, its results, and objects are founded upon certain electrical phenomena which closely resemble those known as "resonance" and "sonorousness" in acoustics.

As an acoustical resonator may be so designed as to respond but feebly to all sound-vibrations except such as correspond to a given and predetermined critical pitch or rate of oscillation, so an electric circuit may be proportioned in such a way that its responses to all harmonic electric vibrations except those of a given critical frequency or rate of oscillation will also be extremely feeble. When a harmonically vibratory electromotive force is impressed upon such a circuit, (which for convenience may be called a "resonator-circuit,") everything else remaining the same, the resulting current in such circuit depends upon the frequency, for there is a critical frequency at which the said current is at a maximum, and any change in the frequency from this point in either direction produces a decreased resulting current. This property of resonance depends upon the simultaneous presence in the circuit of electrostatic and electromagnetic capacity, and in order that an electric circuit may have appreciable resonance it is requisite that it possess sufficient electrostatic and electromagnetic capacity to hold in the form of electrification and electromagnetism an appreciable amount of electrical energy supplied to it.

In my system I effect the distribution and regulation of a plurality of vibratory electric currents impressed upon a main circuit by associating with such main circuit a plurality of resonator-circuits of the character and constitution indicated, each organized and proportioned to select that particular current of the series to which it is responsive or under which it becomes operative. By suitably proportioning the capacities, inductances, and resistances of these resonator-circuits I am able to make them individually responsive to impressed electromotive forces of any desired frequency or rate of vibration. The impedance presented by such circuits to the passage of alternating currents depends upon the frequency of said current, it being lowest when the said frequency is or is approximately that to which the resonator-circuit is designed to respond, and it increases rapidly as the frequency is increased or decreased from that value.

In the operation of the system each resonator-circuit selects from the electromotive forces impressed upon the main circuit that particular one to which it is designed to respond, and a current is developed thereby in any given resonator-circuit, which current is not materially or appreciably interfered with by the currents produced in any of the other circuits.

The invention may be utilized by several methods. It may, for example, be used for the purposes of individual or selective signaling or multiplex telegraphy, and to that end I place signal-receiving apparatus in each of the groups of resonator-circuits, and employing currents of different frequencies the signals are sent and are received on the apparatus of the resonator-circuits, respectively, either simultaneously or not, without mutual interference.

In the employment of alternating or vibratory currents for the production of light, the transmission of power, or other similar useful purposes if it be desired to vary the distribution and supply of current on mains extending from a central supply-station resonator-circuits including suitable translating or electroreceptive devices associated with the main circuit may be placed at the different points of distribution and consumption on such main circuit, and these responding to variations of frequency in the current or part of the current will automatically vary the distribution or consumption, as the case may be.

Thus far I have referred to a number of impressed vibratory electromotive forces of different frequencies; but such an arrangement is not essential, for a single vibratory electromotive force, provided it is not of a simple harmonic character, may be impressed upon a circuit in a manner well understood and is capable of exciting currents of different frequencies, respectively, in several resonator-circuits just as a compound tone is capable of exciting the sonorousness of several acoustical resonators attuned to the different pitches composing the said tone.

We may consider a vibratory electromotive force which is not of a simple harmonic character as a compound of the several harmonic electromotive-force vibrations which when summed will produce the same form of wave. In this invention therefore it is not necessary that for the operation of each associated resonator-circuit there shall be impressed a separate vibratory electromotive force, and where it is more convenient a compound vibratory electromotive force (by which I mean one capable of being resolved or analyzed into a plurality of simple harmonic components) may be used.

In the drawings which illustrate this specification, Figure 1 is a curve drawn to rectangular coördinates, indicating graphically the variation with the frequency of the current in a resonator-circuit, the mean value of the impressed electromotive force remaining constant. Fig. 2 is also a curve drawn to rectangular coördinates, showing how an irregular vibration, indicated by the full-line curve, may be the sum of two regular harmonic components, indicated by the dotted lines. Fig. 3 is a diagram showing a plurality of resonator-circuits associated directly or conductively with a main current-supply or signaling circuit. Fig. 4 indicates a plurality of stations located at different points on a main line, the said stations being each provided with resonator-circuits including suitable signal devices.

In the curve of Fig. 1 the ordinates represent the current strengths and the abscissæ the frequency or number of vibrations per unit of time. The curve is supposed to indicate the current in a resonator-circuit so proportioned that its maximum current is developed with a frequency of $a$, the said current being reduced when the frequency is either greater or less, the figures of course being purely illustrative.

In Fig. 2 the full-line curve C represents the sum of the two regular harmonic component broken-line curves $c$ and $c^2$.

Fig. 3 indicates main conductors A A$^2$ constituting a circuit whereon vibratory electromotive forces may be impressed in any desired combination. I show means at B whereby three different vibratory electromotive forces, each assumed to have its own characteristic frequency, can at will be impressed on the circuit by means of keys $k$, $k^2$, and $k^3$. The operation of these keys is adapted to change the electrical condition of the circuit by the sudden introduction of an electromotive force in a circuit including an electromagnetic inductive resistance and a condenser. The circuits so controlled by such keys I call "sonorous" circuits, such circuits being the electrical analogues of sonorous bodies.

As a tuning-fork may be so proportioned that when a force acting on its prongs is abruptly changed the resulting motion is of a simple harmonic vibratory character of fixed periodicity, so an electric circuit may be proportioned that when its electrical equilibrium is disturbed by an abrupt change in the impressed electromotive force or by an abrupt and marked change in its capacity the resulting current will be of a simple harmonic vibratory character of fixed periodicity. This property of oscillatory restoration of electrical equilibrium is characteristic of certain types of electrical resonator-circuits, it being confined to circuits in which the numerical value of the resistance is less than a certain critical limiting value, said limiting value depending upon the relative values of the capacity and inductance according to well-known principles.

In my invention I effect the impressing of vibratory-current impulses upon a main circuit by associating therewith one or more sonorous circuits which are capable of having their electrical equilibrium abruptly changed through the instrumentality of transmitting devices and current-generators, such as telegraph-keys and batteries or like generators, included in said sonorous circuits. By suitably proportioning the capacities, inductances, and resistances of these sonorous circuits I am able to impart to them a capability of rendering current impulses comprising vibratory currents of any desired frequency. In other words, the frequency of the oscillatory current which develops in a sonorous circuit when its electrical equilibrium is disturbed is determined by the inductance, capacity, and resistance, and their relative proportions in accordance with well-known principles in very much the same manner as the pitch of a tuning-fork is determined by the inertia and elasticity of the prongs and the friction which requires to be overcome in vibrating.

A plurality of sonorous circuits are associated with a main circuit, their number being equal to the number of different frequencies of current which are desired to be impressed on the said main circuit, each such sonorous circuit being supplied with a source of current, such as a battery or other generator, (a magneto-generator may be employed,) and a transmitting device, such as a circuit-controlling key for abruptly changing the supply of current furnished by the said source to the sonorous circuit. By operating any one of these transmitting devices the electrical equilibrium of the sonorous circuit in which it is included will be destroyed, and a vibratory current impulse will result in said sonorous circuit, which impulse will be impressed upon the main line. Since the frequency of the vibratory current composing the impulse is dependent upon the electrical constants of the particular circuits within which the current variations originate, it may be made different for each sonorous circuit. In this manner current impulses of any desired frequency may be impressed upon the main circuit, the current resulting in the said main circuit being a multiperiodic current capable of being resolved by properly proportioned resonator-circuits into its various simple harmonic components. These resonator-circuits or such other devices or appliances as are capable of being operated selectively by vibratory currents of different frequencies may be associated with the main circuit and are so adjusted as to be actuated selectively by the current impulses from one or more of the sonorous circuits, and therefore when any one or more of the transmitting devices included in the sonorous circuits are operated the receiving devices included in the associated resonator-circuits will selectively respond.

Referring again to Fig. 3, the key $k$ when depressed breaks a shunt 20 around a battery or other source of current $b$ and abruptly introduces the latter, together with an electromagnetic inductive resistance $m$, into the main circuit, which also includes a condenser C, thereby impressing an electromotive force upon the sonorous circuit constituted as above and producing in the main circuit A $A^2$ through the intermediation of the converter or induction-coil I a current of an oscillatory character, its frequency (to which some one of the resonator-circuits hereinafter to be described corresponds) being dependent upon the relative values of the capacity, inductance, and resistance in circuit. The depression of the keys $k^2$ and $k^3$ in the same way acts to suddenly introduce oscillatory electromotive forces into sonorous circuits similarly provided with condensers $C^2$ and $C^3$ and electromagnetic inductive resistances $m^2$ and $m^3$, the result being similar and the proportions of the appliances being such as to develop different frequencies of oscillation. Such, however, is but one mode (introduced illustratively) of impressing vibratory electromotive forces on a circuit, and it may be stated that the keys may or may not be operated simultaneously. That portion of the working circuit to the right of the points $a$ and $a^2$ contains the resonator-circuits 30, 31, 32, and 33. M, $M^2$, and $M^3$ are electromagnetic inductive resistances, $c$, $c^2$, and $c^3$ are condensers, and R is a non-inductive resistance. The resonator-circuits in this instance are in direct or conductive connection with the mains A $A^2$. The first resonator-circuit 30 may be traced as follows: A, $x$, condenser $c$, electromagnetic resistance M, $x^2$, $A^2$; the second, 31, through A, electromagnetic resistance $M^2$, $y$, condenser $c^2$, $y^2$, $A^2$; the third, 32, by A, $M^2$, $c^2$, $z$, $M^3$, $z^2$, $A^2$, and the fourth, 33, by A, $M^2$, $c^3$, $w$, R, $w^2$, and $A^2$. Assuming that a compound vibratory current is impressed on the main circuit A $A^2$ and that the capacities and inductances of each of these resonator-circuits have been so proportioned that they each respond to a different frequency, by making the various frequencies of which the compound current is composed conform, respectively, to the critical frequencies of the various resonator-circuits a current of different frequency may be excited in each of the said branch or resonator circuits which is not materially interfered with by currents in the other branches.

I have already adverted to the fact that for the purposes of this invention it is not necessary that separate vibratory electromotive forces and currents shall be employed and that an equivalent compound electromotive force may be impressed upon the main circuit. Such a compound current or electromotive force is virtually a plurality of simple harmonic currents or electromotive forces simultaneously impressed, and for convenience I shall hereinafter in this specification adopt the term "multiperiodic" currents and electromotive forces as one applicable to either case.

The main circuit A $A^2$ of Fig. 4 has associated with it a number of resonator-circuits 30, 31, 32, and 33, containing suitable electroreceptive or translating devices $n$, $n^2$, $n^3$, and $n^4$. This organization is a special application to selective signaling or multiplex telegraphy of the arrangements illustrated in Fig. 3. Any of the well-known forms of translating devices capable of being operated by means of alternating currents—such as telephones, polarized bells, or visible signals—may be employed as the signal-receiving appliances. Circuits 30, 31, and 32 are inductively connected with the mains by transformers I and $I^2$, and circuit 33 connects directly with the said main conductors. Circuit 30 alone is supplied through the transformer I, whose primary is in the branch $u$, bridging the mains at $x$ and $x^2$, and it contains the condenser $c$ and electromagnetic resistance M. Circuits 31 and 32 both depend on the same transformer $I^2$, one condenser $c^2$ serving them both.

The former is provided with the electromagnetic resistance $M^2$, while the latter includes $M^2$ and $M^3$. Circuit 33 is in a bridge uniting the main conductors directly at points $z$ and $z^2$ through the condenser $c^3$ and the electromagnetic resistance $M^4$. In order to selectively signal or telegraph to any particular station in this arrangement, an electromotive force whose frequency corresponds to the critical frequency of the resonator-circuit situated at the station to be signaled is impressed upon the main circuit $A A^2$ and a current results in the said main circuit and in the said particular resonator-circuit. This current operates the translating device or devices in such resonator-circuit at the desired station to the exclusion of those at other stations. Since these signaling-currents may be impressed simultaneously, it is possible by the use of a code or otherwise to send messages between any number of stations simultaneously over the same main or signaling circuit without interference.

The distribution in and by means of a main current-supply circuit, as shown in Fig. 3, may be effected by two distinct methods—first, by the employment of multiperiodic currents impressed on the main circuit $A A^2$; second, by the use of a monoperiodic current impressed upon the said main circuit, which current is capable of being varied in frequency through a given range.

In employing multiperiodic currents or currents of different frequencies any desired amount of current may be thrown into any of the branches simultaneously or otherwise by using frequencies of current corresponding to the critical frequencies of the resonator-circuits which through the various branches connect with the mains. When the monoperiodic current is used, operating-currents may be shifted from any one branch to any other by varying the frequency from that of the critical value of the first to that of the second circuit.

Although in what has hereinbefore been stated I have made mention of resonator-circuits in general, it is not at all such circuits which are available for use in the manner described. For the purposes of this invention it is desirable that these circuits have a very marked resonance for rates of electrical vibration within the range in which it is practicable to develop and distribute electric currents.

In order to have resonator-circuits decisive in their selective action, I find it desirable to have the resistance and capacity small and the inductance large. These limitations are relative, however, for when the critical frequency is high much more resistance can be tolerated in the resonant circuit than would be possible for a circuit with a low critical frequency. The normal resistance of such a circuit can therefore be varied within limits of considerable width. I may, however, state that for several resonator-circuits the proportions of inductance and capacity mentioned below are well adapted to be responsive to the frequencies placed opposite them, respectively:

Resonator-Circuits.

| No. | Effective inductance in henrys. | Effective capacity in microfarads. | Critical frequency in complete alternations per second, approximately. |
|---|---|---|---|
| 1 | 1.0 | 0.4 | 250 |
| 2 | 0.25 | 0.4 | 500 |
| 3 | 0.25 | 0.1 | 1,000 |

In order that sonorous circuits shall be to the fullest extent available for use in the manner and for the purposes described herein, it is desirable that they shall be capable of maintaining oscillations for a time sufficient to overcome the electrical and mechanical inertia of the receiving devices and that the frequency of the oscillations shall not exceed the range within which it is practicable to transmit and receive electric currents.

In order that a sonorous circuit shall be capable of maintaining current vibrations for a considerable time after one of the sudden changes in electromotive force or current such as those herein described have been made, I find it advantageous to employ as large an inductance and as small a resistance as possible.

I have used inductances as high as four henrys in connection with resistances as small as twenty ohms when using ordinary frequencies, such as occur in the practice of electric lighting, and I have also used extremely high frequencies, such as are at present only to be reached by the method of operation hereinbefore indicated.

An example of circuits suitably proportioned for the development of given critical frequencies is given in the following table:

| Circuit number. | Effective inductance in henrys. | Effective capacity in microfarads. | Effective dissipative resistance in ohms. | Critical frequency in complete alternations per second, approximately. |
|---|---|---|---|---|
| 1 | 4 | .1 | 20 | 250 |
| 2 | 4 | .025 | 20 | 500 |
| 3 | 2 | .0125 | 50 | 1,000 |

Although I have described condensers as constituting a well-known means of providing the desired capacity of sonorous circuits, other means are accessible and may, if desired, be adopted. The electromagnetic resistance and the capacity may, for instance, be combined in a single appliance by winding the said inductive resistance with ribbon-shaped conductors, whereby a very considerable capacity may be imparted thereto, and in cases where induction-coils are employed in association with sonorous circuits it is not absolutely necessary to use separate appliances to furnish the essential inductance, since this may, if desired, be wholly or in part supplied by the primary winding of the said induction-coil.

I claim—

1. The combination, substantially as hereinbefore described, of a main or signaling circuit; a sonorous circuit of definitely-proportioned resistance, capacity and inductance associated therewith; means for abruptly varying the electrical condition or disturbing the electrical equilibrium of the said sonorous circuit, thereby producing in said circuit a vibratory current of definite frequency, and a resonator-circuit also associated with said main or signaling circuit and proportioned to the current developed in said sonorous circuit, as set forth.

2. The combination of a main or signaling circuit; a sonorous circuit of definitely-proportioned resistance, capacity and inductance associated therewith, with a normally disconnected electrical generator; and a key or circuit-controller whereby the said generator may be abruptly connected with the said sonorous circuit, as set forth.

3. The combination of a main or signaling circuit; a plurality of sonorous circuits associated therewith, and differently proportioned, as described herein, for the development of oscillatory currents of differing frequencies when impressed with a uniform electromotive force; an electrical generator, and a key for each sonorous circuit controlling the connection of the said generator therewith; with a number of resonator-circuits including translating or signaling devices in like manner associated with the said main circuit, and proportioned to correspond with the said sonorous circuits respectively, whereby the said translating devices may be selectively actuated by the manipulation of the key of the sonorous circuit corresponding to the resonator-circuit within which said devices are included, as set forth.

4. The combination, substantially as hereinbefore described, with a main or signaling circuit, of two associated sonorous resonator-circuits of definitely-proportioned resistance, capacity and inductance, each including a signal-receiving instrument responsive to vibratory electric currents produced in its circuit by the action of main-circuit currents generated by the operation of a distant transmitter, a source of current and a signal-transmitting instrument adapted to develop similar main-line currents for the operation of a distant receiver by suddenly varying the electromotive force or current of its own circuit.

JOHN STONE STONE.

Witnesses:
GEO. WILLIS PIERCE,
JAMES E. LYNCH.